United States Patent
Suzuki et al.

(10) Patent No.: US 9,708,987 B2
(45) Date of Patent: Jul. 18, 2017

(54) CONTROL APPARATUS FOR CONTROLLING COMBUSTION IN COMPRESSION-IGNITION INTERNAL COMBUSTION ENGINE

(71) Applicant: DENSO CORPORATION, Kariya, Aichi-pref. (JP)

(72) Inventors: Masayuki Suzuki, Toyota (JP); Hideo Naruse, Chiryu (JP); Jun Kawamura, Aichi-ken (JP); Koji Ishizuka, Aichi-ken (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 14/564,681

(22) Filed: Dec. 9, 2014

(65) Prior Publication Data
US 2015/0159565 A1 Jun. 11, 2015

(30) Foreign Application Priority Data

Dec. 10, 2013 (JP) .................................. 2013-255493

(51) Int. Cl.
*F02D 41/00* (2006.01)
*F02D 35/02* (2006.01)
(Continued)

(52) U.S. Cl.
CPC ....... *F02D 41/0002* (2013.01); *F02D 35/028* (2013.01); *F02D 41/005* (2013.01);
(Continued)

(58) Field of Classification Search
CPC ............... F02D 41/0002; F02D 41/005; F02D 41/0052; F02D 41/403; F02D 35/023;
(Continued)

(56) References Cited

U.S. PATENT DOCUMENTS 5,201,300 A * 4/1993 Iiyama .................... F02D 21/08
123/299
5,363,832 A * 11/1994 Suzumura ............ G01N 27/404
123/478
(Continued)

FOREIGN PATENT DOCUMENTS

JP 7-332140 12/1995
JP 10-19775 1/1998
(Continued)

OTHER PUBLICATIONS

JP 2011-231619 English Translation Version.*
(Continued)

*Primary Examiner* — John Kwon
*Assistant Examiner* — Johnny H Hoang
(74) *Attorney, Agent, or Firm* — Nixon & Vanderhye P.C.

(57) ABSTRACT

The density of fuel being used by a compression-ignition engine and the flammability of the fuel (readiness to ignite when injected into a combustion chamber of the engine, under the current operating conditions of the engine) are respectively detected. When the flammability is excessively low and the density is above a threshold value, the oxygen concentration of the intake air supplied to the cylinders is increased until the flammability reaches a reference condition, while when the flammability is excessively low and the density is below the threshold value, the compression ratio of the engine (and/or each pilot injection amount) is increased until the flammability reaches the reference condition.

12 Claims, 2 Drawing Sheets

(51) Int. Cl.
*F02D 41/40* (2006.01)
*F02D 41/38* (2006.01)

(52) U.S. Cl.
CPC ....... *F02D 41/0052* (2013.01); *F02D 41/403* (2013.01); *F02D 35/023* (2013.01); *F02D 2041/001* (2013.01); *F02D 2041/0022* (2013.01); *F02D 2041/389* (2013.01); *F02D 2200/0611* (2013.01); *Y02T 10/42* (2013.01); *Y02T 10/44* (2013.01); *Y02T 10/47* (2013.01)

(58) Field of Classification Search
CPC ............ F02D 35/028; F02D 2041/001; F02D 2041/0022; F02D 2041/389; F02D 2200/0611; Y02T 10/42; Y02T 10/44; Y02T 10/47
USPC ......... 701/102–105, 108–109, 115; 123/294, 123/295, 299, 305
See application file for complete search history.

(56) References Cited

U.S. PATENT DOCUMENTS

| | | | | |
|---|---|---|---|---|
| 6,044,831 | A * | 4/2000 | Takagi | F02D 41/0032 123/520 |
| 6,182,632 | B1 * | 2/2001 | Yanagihara | F02B 1/12 123/299 |
| 7,047,741 | B2 * | 5/2006 | Gray, Jr. | F01N 3/035 123/301 |
| 2003/0217732 | A1 * | 11/2003 | Kataoka | F02B 1/12 123/276 |
| 2005/0188948 | A1 | 9/2005 | Miura | |
| 2006/0016423 | A1 * | 1/2006 | Kuo | F02D 13/0215 123/299 |
| 2009/0105965 | A1 * | 4/2009 | Birk | F02D 41/0025 702/30 |

FOREIGN PATENT DOCUMENTS

| | | |
|---|---|---|
| JP | 2005-240757 | 9/2005 |
| JP | 2006-090223 | 4/2006 |
| JP | 2008-002328 | 1/2008 |
| JP | 2009-235967 | 10/2009 |
| JP | 2010-071194 | 4/2010 |
| JP | 2011-052629 | 3/2011 |
| JP | 2011-231619 | 11/2011 |
| JP | 2011-252393 | 12/2011 |
| JP | 2012-132411 | 7/2012 |
| JP | 2013-130098 | 7/2013 |

OTHER PUBLICATIONS

JP 2008-002328 English Translation Version.*
Office Action (4 pages) dated Jan. 5, 2016, issued in corresponding Japanese Application No. 2013-255493 and English translation (7 pages).

* cited by examiner

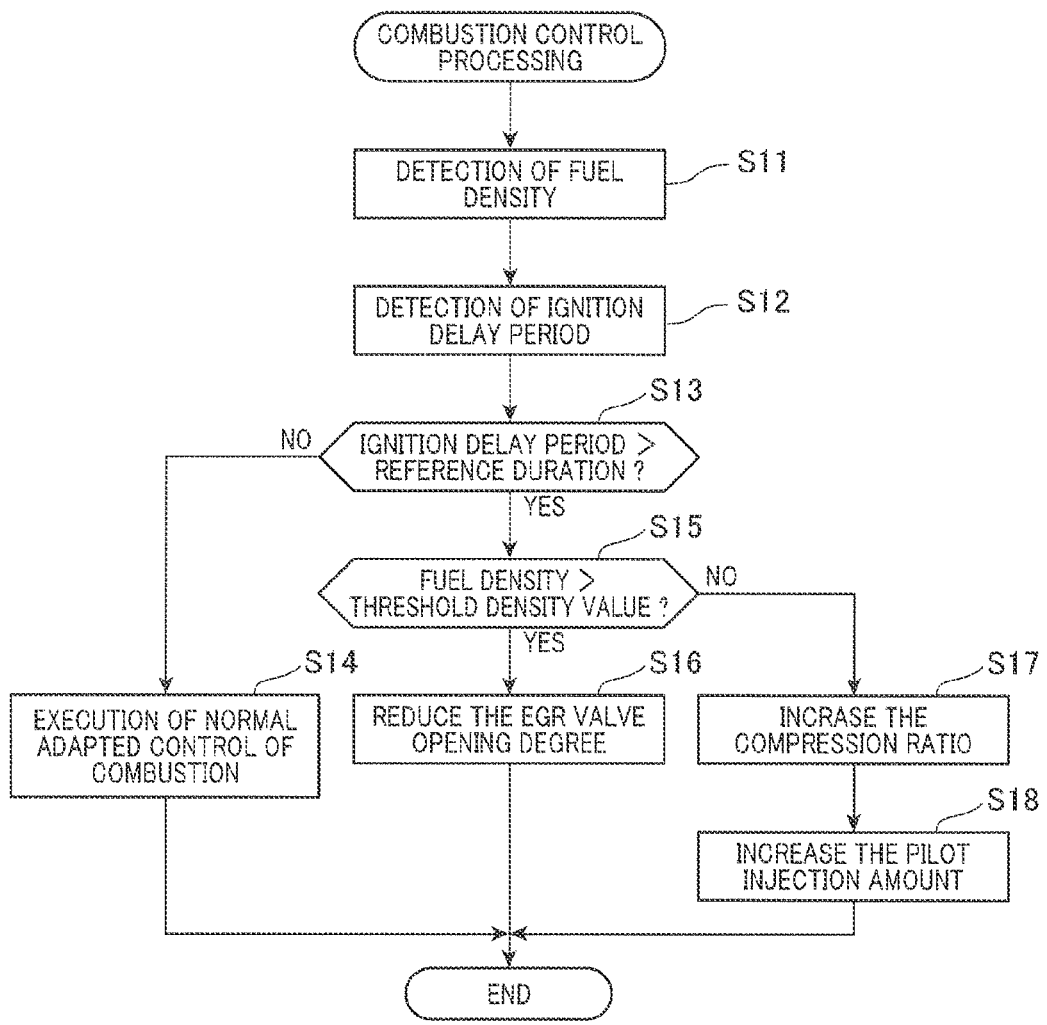

CONTROL APPARATUS FOR CONTROLLING COMBUSTION IN COMPRESSION-IGNITION INTERNAL COMBUSTION ENGINE

CROSS-REFERENCE TO RELATED APPLICATIONS

This application is based on and incorporates herein by reference Japanese Patent First Application No. 2013-255493 filed on Dec. 10, 2013.

BACKGROUND OF THE INVENTION

Field of Application

The present invention relates to a control apparatus for an internal combustion engine, and in particular to a control apparatus for controlling combustion in a compression-ignition type of engine.

Background Technology

Technology is known for calculating the latent heat of vaporization, low-order calorific value and density of a fuel oil (referred to in the following simply as a fuel), based on detecting the Cetane number of the fuel, as described in Japanese patent publication No. 2012-132411. Also, as described in that patent, it is known to calculate the amount of fuel to be injected in each pilot injection that is executed by a compression-ignition engine, based on the calculated values of latent heat of vaporization, low-order calorific value and density of the fuel utilized by the engine. It is proposed in that way to control the amount of each pilot injection such that the calorific value of each injection is equal to the value obtained when using a standard grade of light oil as fuel. The calorific value of each pilot injection is to be thereby made independent of the type of fuel actually used.

However even if the calorific value of each pilot injection amount is controlled to be constant, there is a danger that cooling losses may be increased and increased amounts of soot etc., may be produced when certain types of fuel are utilized. This is due to concentration of the combustion region, within the combustion chamber of each cylinder of the engine, close to the walls of the combustion chamber. There is thus a need for improvements of the technology described in the above patent.

SUMMARY OF THE INVENTION

Hence it is desired to overcome the above problem by providing a control apparatus for a compression-ignition engine, whereby combustion control is executed in accordance with properties of the fuel used by the engine. The combustion control is executed such as to reduce cooling losses and to reduce the degree of formation of soot, while also reducing exhaust emission amounts and lowering fuel consumption, without reducing the output power available from the engine.

According to a first aspect, such a control apparatus, applicable to a compression-ignition engine having at least one cylinder and a fuel injector for executing injections of fuel into the cylinder, includes density detection circuitry, flammability detection circuitry, oxygen concentration increase circuitry, and compression ratio increase circuitry.

The term "flammability" is used herein in a special sense, signifying a value which increases in accordance with increased readiness of a fuel to ignite when the fuel is injected into a cylinder of a specific compression-ignition engine at an ignition timing, under the current operating conditions of that engine. Preferably, the flammability is judged based on the ignition delay time (interval between commencement of injection and subsequent ignition time point) of the fuel. That is, the detected value of flammability increases in accordance with decrease of the ignition delay time.

In the case of an engine in which each injection consists of a plurality of injections including a pilot injection and a main injection, the ignition delay time is measured between the time point of commencement of the main injection and the subsequent ignition time point (e.g., as indicated by a rapid increase in combustion chamber pressure).

The purpose of detecting the density of the fuel being used by the engine (specifically, judging whether the detected density exceeds a predetermined reference value) is to determine whether a relatively heavy grade or relatively light grade of oil is being used as fuel, i.e., containing a large proportion or a small proportion of heavy-grade constituents. A heavy grade of fuel oil readily produces large amounts of soot upon combustion and can cause unstable running of the engine, if the oxygen concentration of the intake air of the engine is insufficient. Hence with the present invention, when it is judged that such a fuel is being utilized (as indicated by the detected fuel density being above the reference value) and the flammability is detected as being below a reference value of flammability, the oxygen concentration of the intake air is increased. Oxidation of the injected fuel is thereby promoted, providing stability of combustion by increasing the flammability of the injected fuel. This is achieved without increasing each injection amount, thereby preventing increased amounts of soot from being produced, while in addition, suitable ignition timings can be achieved, with combustion occurring in an appropriate region of the combustion chamber.

In the case of an engine incorporating an EGR (Exhaust Gas Recirculation) apparatus, the oxygen concentration is preferably increased by decreasing the proportion of exhaust gas which is mixed with the intake air of the engine by the EGR apparatus.

If the fuel has a low detected value of density, then the fuel contains a high proportion of light-grade constituents. Such a light grade of fuel does not readily generate soot upon combustion, even if the fuel injection amount is increased. However the flammability (as defined above) may be low, in which case the injected fuel may have become dispersed to a region close to the walls of the combustion chamber when combustion commences. Hence, cooling losses may be increased, and increased emission of hydrocarbons in the exhaust gas may arise due to fuel adhering to the walls of the combustion chamber, while combustion may be unstable.

If the oxygen concentration were to be increased, to increase the flammability in such a case, there is a danger that the amounts of NOx emissions would be increased. Hence, according to this aspect of the invention, if it is detected that the flammability of the injected fuel is below the reference value of flammability and the density of the fuel is below the reference value of density, the compression ratio of the engine is increased. The extent of dispersion of the injected fuel prior to ignition can thereby be reduced, and combustion can be stabilized. This is achieved without increasing the oxygen concentration of the intake air, so that increase of the amounts of hydrocarbons to and NOx in the exhaust gas can be avoided. Furthermore, soot will not be readily generated at combustion, even when the compression ratio is increased.

In the case of an engine having a VVT (Variable Valve Timing) apparatus, the compression ratio can be increased by controlling the VVT apparatus to appropriately change the opening/closing timings of the intake valves of the engine.

In addition, in the case of an engine in which each injection consists of a plurality of injections including a pilot injection and a main injection, the control apparatus may incorporate pilot injection increase circuitry, for increasing the fuel amount of each pilot injection when it is detected that the flammability of the injected fuel is less than the reference value of flammability and the fuel density is below the reference value of density. The combustion of the main injection can thereby be stabilized, due to stable combustion of the pilot injection. This is advantageous since, when a light grade of fuel is used and the engine is being run under only a light load, there is a danger that the fuel of a pilot injection will become excessively dispersed before ignition can occur, causing failure of ignition of the pilot injection. However by appropriately increasing the pilot injection amount when such a condition causes low flammability of the fuel, this problem can be avoided.

Such increase of the pilot injection amount may be performed in addition to increasing the compression ratio, or as an alternative to increasing the compression ratio.

Hence with the present invention, when the flammability of the injected fuel is insufficient, respectively different forms of combustion control are applied, selected based on the detected density of the fuel. This can increase the flammability to ensure stability of combustion, and prevent increase of exhaust emissions and soot, while maintaining the level of power available from the engine.

DESCRIPTION OF PREFERRED EMBODIMENTS

An embodiment of a combustion control apparatus is described in the following. The embodiment is specifically directed to controlling combustion in a diesel engine of a vehicle.

Figure 1:
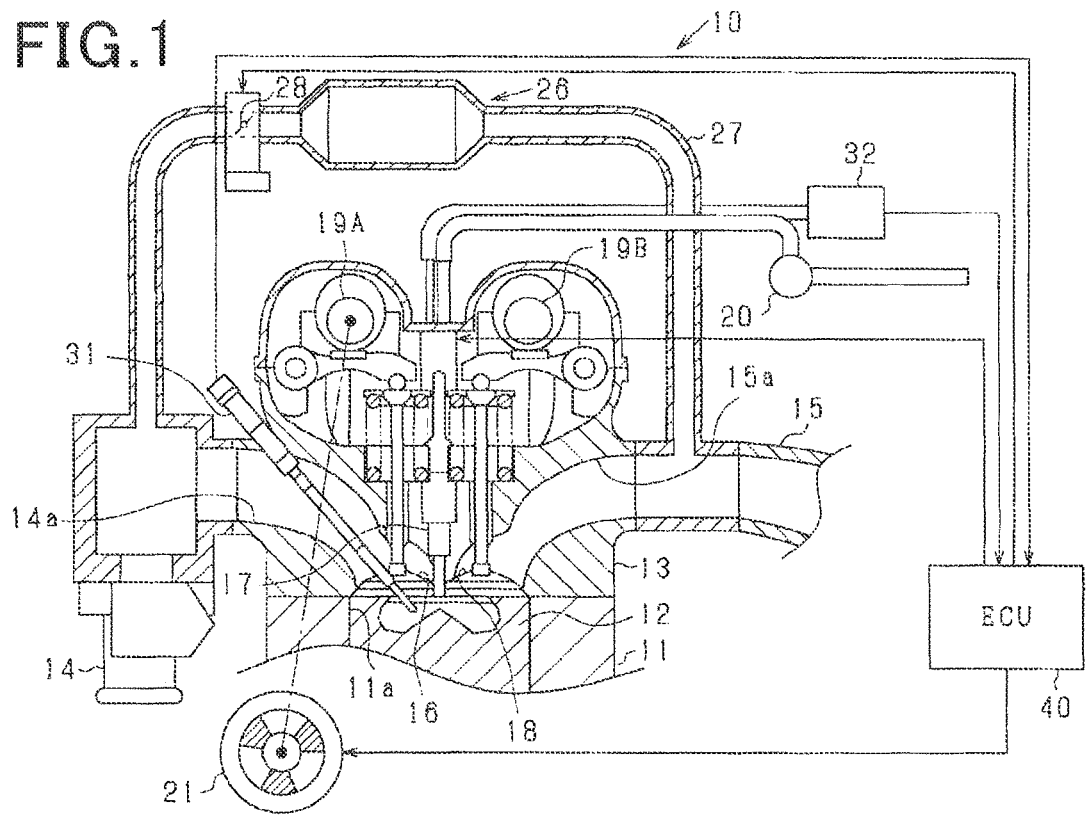
FIG. 1 is a conceptual diagram of a diesel engine and of an embodiment of a combustion control apparatus based upon an engine control ECU.

FIG. 1 is a conceptual diagram illustrating a diesel engine 10 to which combustion control is applied by the embodiment. The engine 10 may be a 4-cylinder engine, for example, however only one of the cylinders 11a of the engine 10 is illustrated. The following description applies to each of the cylinders 11a. As shown, the engine 10 includes an engine block 11 having the cylinders 11a formed therein, a cylinder head 13, an intake manifold 14, an exhaust manifold 15, a VVT (Variable Valve Timing) apparatus 21, and an EGR (Exhaust Gas Recirculation) apparatus 26, etc. Each cylinder 11a has a corresponding intake valve 16 and exhaust valve 18, and a fuel injector (referred to in the following simply as an injector) 17.

A piston 12 executes reciprocating motion within each corresponding cylinder 11a. The cylinder head 13 is installed on the engine block 11, with each cylinder 11a, the top surface of the corresponding piston 12 and an inner surface of the cylinder head 13 enclosing a corresponding combustion chamber.

The intake manifold 14 is attached with respect to the engine block 11. Each cylinder 11a communicates with intake manifold 14 via a corresponding intake port 14a which is formed within the cylinder head 13. Camshafts 19A and 19B are each driven from the crankshaft (not shown in the drawings) of the engine 10. The intake valve 16 of each cylinder 11a is driven by the camshaft 19A for opening/closing the corresponding intake port 14a. The VVT apparatus 21 varies the opening/closing timings of each intake valve 16 by adjusting the rotation phase of the camshaft 19A with respect to that of the crankshaft of the engine 10.

The exhaust manifold 15 is attached to the engine block 11, communicating with each cylinder 11a via a corresponding exhaust port 15a formed within the cylinder head 13. Each exhaust valve 18 is driven by rotation of the camshaft 19B, for opening/closing the corresponding exhaust port 15a.

A fuel pump (not shown in the drawings) impels fuel into a common rail 20, to be stored therein under pressure. Each injector 17 is controlled by injection command signals supplied from the ECU 40 to inject a controlled amount of fuel, supplied under pressure from the common rail 20, into the corresponding cylinder 11a, at successive injection timings. With this embodiment, each fuel injection consists of a pilot injection which is followed by a main injection, with each fuel injection amount being determined by the injection command signals supplied from the ECU 40.

The EGR apparatus 26 includes an EGR passage 27 and an EGR valve 28, with the EGR passage 27 connecting the intake manifold 14 and exhaust manifold 15, and with the EGR valve 28 being controlled for opening/closing the EGR valve 28. When the EGR valve 28 is open, part of the exhaust gas within the exhaust manifold 15 is led into the intake manifold 14, to mix with intake air from the exterior. The rate of flow of the exhaust gas which is thus mixed with the intake air is determined by the degree of opening of the EGR valve 28, referred to herein as the EGR amount.

In each intake stroke of the engine 10, air is drawn into a cylinder 11a via the intake manifold 14, and then is compressed in a compression stroke. Near the TDC (top dead center) position of the piston 12 in the compression stroke, fuel is injected into the cylinder 11a from the corresponding injector 17, and becomes ignited, commencing a combustion stroke. Exhaust gas within the cylinder 11a is then exhausted via the exhaust manifold 15, in an exhaust stroke, with a part of the exhaust gas in the exhaust manifold 15 being controllably transferred to the intake manifold 14 by the EGR apparatus 26 as described above.

With this embodiment, the engine 10 is also equipped with pressure sensors 31 respectively provided for each cylinder 11a, and with a fuel density sensor 32. Each cylinder pressure sensor 31 detects variations in pressure within the corresponding cylinder 11a. The fuel density sensor 32 detects the density of the fuel that is injected by the fuel injectors 17. The fuel density sensor 32 may, for example, detect the fuel density by applying a characteristic vibration frequency method of detection.

The ECU 40 is based on a microcomputer having a CPU (Central Processing Unit), and memory devices including a ROM (Read-Only Memory) and a RAM (Random Access Memory), together with input/output interface circuits, etc. A program is stored beforehand in a memory device such as the ROM, and the ECU 40 controls the operation of each injector 17, the VVT apparatus 21, and the EGR apparatus 26, etc., of the engine 10, by executing the instructions of the stored program. Normally (i.e., other than when a specific condition of the fuel is detected as described hereinafter) the ECU 40 performs engine control operations, in accordance with the program instructions, based on detection values are acquired from each cylinder pressure sensor 31 and from various other sensors (not shown in the drawings) including a crank angle sensor, an engine coolant temperature sensor, and an accelerator opening degree sensor. Such control of the engine 10 is referred to in the following as normal adapted control, i.e., in which the operating conditions of each injector 17 (e.g., injection amounts and injection timings), of the VVT apparatus 21, and of the EGR apparatus 26, etc., are adapted to the currently required operating condition of the engine 10.

Figure 2:
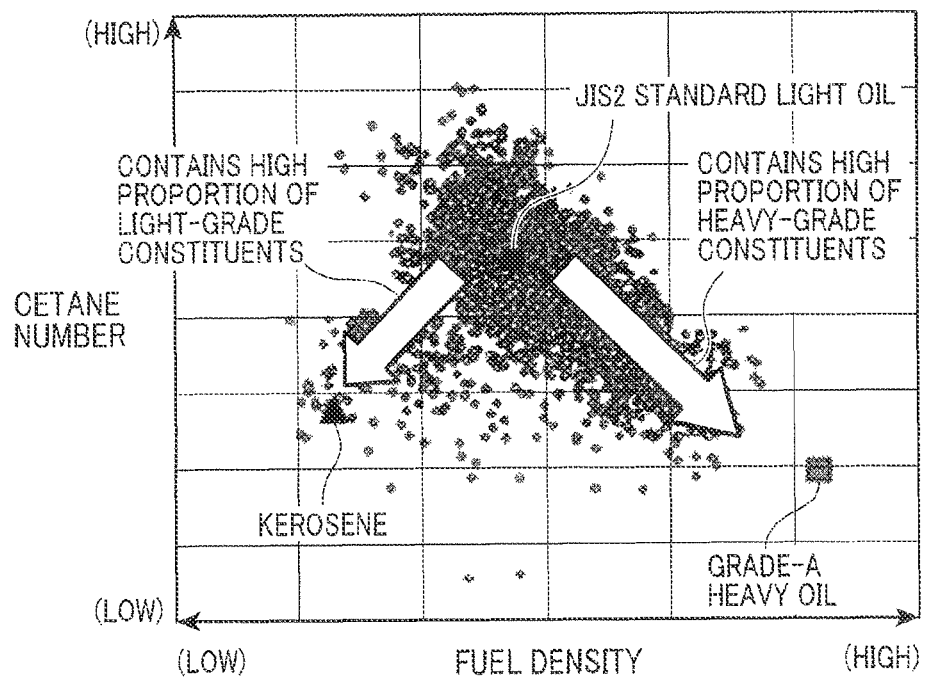
FIG. 2 is a distribution diagram, illustrating the distribution of various fuel oils with respect to values of fuel density and Cetane number; and, FIG. 3 is a flow diagram of a processing sequence executed by the ECU of the embodiment for combustion control of the engine.

FIG. 2 is a distribution diagram showing the distribution of types of fuel with respect to values of fuel density and Cetane number. As shown, the center of the distribution is close to JIS No. 2 light oil, which is classified as No. 2 in the JIS K2204 standards, with the distribution being broadly separated between kerosene and A-grade heavy oil. The closer the fuel is to kerosene, the greater the proportion of light-grade constituents in the fuel, i.e., the lighter is the fuel. The closer the fuel is to A-grade heavy oil, the greater the proportion of heavy-grade constituents in the fuel, i.e., the heavier is the fuel. The greater the proportion of light-grade constituents, the lower is the density of the fuel, while conversely, the greater the proportion of heavy-grade constituents, the higher is the density of the fuel. Furthermore the closer the fuel is to kerosene, the lower is the Cetane number of the fuel, while also the closer the fuel is to A-grade heavy oil, the lower is the Cetane number of the fuel.

Thus, even when two fuels have the same Cetane number, each fuel may be either a light fuel or a heavy fuel. In general, as illustrated, a light fuel has a relatively low Cetane number. This signifies that when used in a compression-ignition engine, a light fuel has a relatively long ignition delay time (i.e., relatively long interval between fuel injection time point and ignition time point), by comparison with a fuel having a relatively high Cetane number. However a light fuel does not readily generate soot upon combustion. A heavy fuel also has a relatively low Cetane number, and readily generates soot upon combustion. Hence, even if the fuel injection amounts, the opening/closing timings of the intake valve 16, and the EGR (exhaust gas regeneration) amount are controlled in accordance with the Cetane number of the fuel which is being used by the engine, fuel combustion may not be appropriately controlled.

In the following description and in the appended claims, the term "flammability" of a fuel is to be understood in a special sense, signifying a value which increases in accordance with increased readiness of the fuel to ignite when injected into a cylinder of a specific compression-ignition engine under the current operating conditions of the engine. Hence the flammability varies in accordance with the properties of the fuel and with the current operating conditions of the specific engine. With the present embodiment, when the flammability of the fuel is less than a predetermined reference value, respectively different forms of combustion control are applied in accordance with the density of the fuel.

FIG. 3 is a flow diagram of a processing sequence which is executed by the ECU 40 for combustion control. The processing of FIG. 3 is repetitively executed, for example being executed once at each injection timing of an injector 17.

In FIG. 3, firstly (step S11) the detected value of density of the fuel which is being supplied to the injectors 17 is acquired from the fuel density sensor 32. Next in step S12, the ignition delay time is detected, based on the detection signal from the cylinder pressure sensor 31 of a cylinder 11a. With this embodiment, the ignition delay time is detected as the interval extending from the time point at which fuel is injected by an injector 17 (in a main injection, as designated by a command signal from the ECU 40) until an increase in pressure within the corresponding cylinder (at ignition of the main injection) is detected by the cylinder pressure sensor 31. It should be noted that the order of executing the steps S11 and S12 could be the inverse of that in FIG. 3.

Next, in step S13, a decision is made as to whether the ignition delay time exceeds a reference value, thereby indicating that the flammability of the fuel (as defined hereinabove) is below the reference value of flammability. The reference value of ignition delay time is predetermined as suitable for judging whether the flammability of the fuel is normal. If it is judged in step S13 that the ignition delay time does not exceed the reference value (NO decision) then the various apparatuses (EGR valve, etc.) are controlled to operate in a normal adapted control condition (step S14). Specifically, the fuel injection quantity of each injector 17, the timings of opening/closing the exhaust valve 16 by the VVT apparatus 21, and the degree to which the EGR valve 28 of the EGR apparatus 26 is opened, are each controlled to be in a status adapted to the currently required operating condition of the engine 10, with the control performed based on the detection signals from various sensors (accelerator opening degree sensor, etc.,) as described above. The processing sequence is then ended.

However if it is judged in step S13 that the ignition delay time exceeds the reference value (YES decision), a decision is made (step S15) as to whether the detected value of fuel density exceeds a threshold value. The threshold value is predetermined such as to enable judgement as to whether the fuel being used is closer to a heavy fuel or closer to a light fuel. If it is judged in step S15 that the fuel density exceeds the threshold value (YES decision), then the opening degree of the EGR valve 28 is reduced by a predetermined percentage, e.g., is reduced by 1% (step S16). That is to say, if it is judged that a heavy fuel oil is being used, then the oxygen concentration in the intake air supplied to the cylinder 11a is increased, by reducing the EGR amount. The processing sequence is then ended.

If it is judged in step S15 that the fuel density does not exceed the threshold value (NO decision), the compression ratio of the intake air is increased by a specific amount, by adjusting the VVT opening/closing timing by a specific amount, e.g., 1 degree (step S17). That is, if the fuel being utilized is judged to be a light fuel, then the opening/closing timings of the intake valve 16 are changed such as to increase the compression ratio. With this embodiment, the VVT apparatus 21 increases the compression ratio by setting the closing timing of the intake valve 16 closer to the BDC (bottom dead center) timing of each intake stroke of the engine, thereby increasing the amount of intake air which is drawn into the cylinder 11a in the intake stroke.

Following step S17, in step S18, the fuel amount of each pilot injection by the injector 17 is increased by a predetermined amount, e.g., 0.2 mm$^3$. The processing sequence is then ended. It should be noted that the order of executing the steps S17 and S18 could be the inverse of that in FIG. 3.

It can thus be understood that so long as the fuel flammability is less than the threshold value (NO decision in step S13):

if the fuel density is above the threshold value of density (more specifically, is greater than or equal to that threshold value) steps S11 to S15 and S16 are successively executed in each repetition of the processing routine of FIG. 3, while if the fuel density is less than the threshold value of density, steps S11 to S15 and S16, S18 are successively executed in each repetition of the processing routine.

However when any of the following conditions (a) or (b) is reached, further control by executing steps S16 or steps S17, S18 is ended, even if a YES decision is reached in each execution of step S13:

(a) a control range limit value has been reached in step S16, S17 or S18 (e.g., the EGR valve opening degree reaches 0%); or (b) a limit imposed by engine operation has been reached, e.g., the compression ratio has increased to an extent whereby the pressure within a cylinder reaches the maximum allowable design value.

The embodiment relates to the appended claims as follows. The ECU 40, in executing the processing of step S11, corresponds to density detection circuitry, and the fuel density sensor 32 corresponds to a density detection device. The ECU 40, in executing the processing of step S12, corresponds to flammability detection circuitry. The ECU 40, in executing the processing of step S16, corresponds to oxygen concentration control circuitry, and the EGR apparatus 26 corresponds to an oxygen concentration variation device. The ECU 40, in executing the processing of step S17, corresponds to compression ratio control circuitry, while the VVT apparatus 21 corresponds to a compression ratio variation device. The ECU 40, in executing the processing of step S18, corresponds to pilot injection amount increase circuitry, while the fuel injector 17 corresponds to an injection amount variation device.

With the combustion control described above, when the oxygen concentration of the intake air supplied to the cylinder 11a is increased (i.e., when a YES decision is made in step S15, indicating a heavy grade of fuel having low flammability is being utilized), oxidation of the fuel is promoted, so that the ignition delay time of the fuel is reduced. Hence, the region within the combustion chamber in which ignition occurs will be shifted to the interior of the combustion chamber, i.e., the center of combustion becomes moved away from the wall of the combustion chamber, thereby reducing the amount of energy lost due to cooling by contact between the hot combustion gases and the wall of the combustion chamber. Furthermore, by promoting the oxidation of heavy-grade constituents in the fuel before polymerization of these constituents occurs, the generation of soot can be suppressed.

It should be noted that when a heavy grade of fuel is being utilized, if the fuel injection amount is increased, it becomes more difficult for oxygen to contact the spray droplets of the injected fuel, thereby increasing the danger that soot will be generated. With the above embodiment, that problem can be avoided.

When the compression ratio of the intake air of the cylinder 11a is increased (i.e., when a NO decision is made in step S15, indicating a light grade of fuel having low flammability), the spray of injected fuel from the injector 17 will more readily interact with the intake air, thereby reducing the extent to which the fuel will become dispersed before becoming ignited. Increase of the compression ratio also increases the temperature to which the air within the cylinder 11a rises due to the compression, so that the fuel will more readily become ignited. Hence, increasing the compression ratio will shorten the ignition delay time. In addition, the region in which ignition occurs will be shifted to the interior of the combustion chamber, thereby reducing the amount of energy that is lost due to cooling by contact between the hot combustion gases and the wall of the combustion chamber.

Furthermore when the injection amount of each pilot injection is increased, combustion of the fuel of the pilot injection becomes more stable, while also the temperature within the cylinder 11a (prior to ignition of the main injection) becomes increased. As a result, combustion of the main injection can be made more stable.

It should be noted that if (instead of increasing the compression ratio and/or increasing the pilot injection amount) the oxygen concentration were to be increased when a light grade of fuel is utilized, there would be a danger of increased amounts of NOx (nitrous oxides) in the exhaust gas.

The above embodiment provides the following advantages:

(1) When the density of the fuel being utilized is detected as exceeding a predetermined threshold value, this signifies that the fuel contains a high proportion of heavy-grade constituents, so that soot will readily be generated upon combustion of the fuel. Hence with the above embodiment, when the detected degree of flammability of the fuel is lower than a predetermined reference value, while also the density of the fuel is detected as exceeding the threshold value of density, the oxygen concentration of the intake air supplied to the cylinder 11a is increased. This provides greater stability of combustion and increases the flammability of the fuel. As a result, oxidation of the fuel is promoted and more stable combustion is achieved. This is done without increasing the fuel injection amount, so that generation of soot can be avoided.

(2) When the detected density of the fuel is below the threshold value of density, this signifies that the fuel contains a high proportion of light-grade constituents, so that soot will not readily be generated by combustion of the fuel. Hence with the above embodiment, when the detected flammability of the fuel does not attain the reference value of flammability, while also the detected density of the fuel is below the threshold value of density, the compression ratio of the intake air of the cylinder 11a is increased. As a result, excessive dispersion of the injected fuel prior to ignition of the fuel can be prevented, and stable combustion ensured, by increasing the flammability of the fuel. Moreover by minimizing the amount of injected fuel spray which reaches the walls of the combustion chamber prior to ignition, cooling losses and generation of hydrocarbons can be reduced. This is achieved without increasing the oxygen concentration of the intake air, so that stable combustion is maintained, and hence, generation of NOx pollutants can be suppressed. Furthermore a light grade of fuel will not readily generate soot upon combustion, even when the compression ratio is increased.

(3) With the above embodiment, when the detected flammability of the fuel is below the reference value of flammability, while also the detected density of the fuel is below the threshold value of density, the pilot injection amount is increased. As a result, combustion of the pilot injection fuel is stabilized, and combustion of the fuel of the main injection is promoted. This is achieved without increasing the oxygen concentration of the intake air, so that stable combustion is maintained and generation of NOx pollutants is thereby suppressed. Furthermore although the pilot injection amount is increased, soot will not be readily generated, since a light grade of fuel is being utilized.

Hence, from the above features, when the flammability of the fuel does not attain the reference value, combustion is controlled in accordance with the density of the fuel. This enables combustion to be promoted, thereby preventing increase of exhaust gas pollutant emissions, without lowering of output power of the engine or increasing fuel costs.

The following modifications to the above embodiment may be envisaged:

Firstly, with the above embodiment the oxygen concentration in the intake air supplied to the cylinder 11a is increased by controlling the EGR apparatus 26 to reduce the EGR amount. However it would be equally possible to achieve the same effect by increasing the amount of fresh air (unmixed with exhaust gas) taken into the cylinder in each intake stroke, while leaving the opening degree of the EGR valve unchanged.

Furthermore, with the above embodiment the compression ratio of the intake air in the cylinder 11a is increased by controlling the VVT apparatus 21 to alter the opening/closing timings of the intake valve 16. However it would be equally possible to achieve the same effect by applying VVT control to the opening/closing timings of the exhaust valve 18. Alternatively, it would be possible to alter the opening/closing timings of both the intake valve 16 and the exhaust valve 18, to increase the compression ratio.

Moreover it would be possible to modify the combustion control processing shown in FIG. 3 such as to use only the processing of step S17 or only the processing of step S18, instead of using both of these processing steps. In that case too, it will be ensured that combustion of the injected fuel spray will occur before the fuel can become concentrated at the wall of the combustion chamber. Hence, cooling losses and generation of hydrocarbon pollutants can be prevented, without increasing the oxygen concentration of the intake air supplied to the cylinder 11a. Step S18 is of course omitted if pilot injections are not executed.

Furthermore, with the above embodiment the flammability (as defined hereinabove) of the fuel is detected based on the ignition delay time of the fuel. However it would be equally possible to detect the flammability based on an amount of variation in the torque of the engine (e.g., detected as occurring between the commencement of a fuel injection and completion of the corresponding combustion stroke). In that case, the flammability would be judged as being below a reference value if the amount of torque variation exceeds a predetermined reference amount of variation.

Alternatively, it would be possible to detect the flammability based on detecting a combustion period as the time which elapses from start of combustion (ignition) to completion of combustion, in a combustion stroke. This can be detected based on variations in combustion chamber pressure. In that case, the flammability would be judged as being below the reference value of flammability if the combustion period exceeds a predetermined reference duration.

What is claimed is:

1. A control apparatus for application to a compression-ignition engine, the engine having at least one cylinder and a fuel injector controllable for executing injections of fuel into the cylinder, an oxygen concentration variation device operable for varying an oxygen concentration of intake air supplied to the cylinder, and a compression ratio variation device operable for varying a compression ratio of intake air within the cylinder:
wherein the control apparatus comprises:
density detection circuitry configured for detecting a density of the fuel which is injected by the fuel injector;
flammability detection circuitry configured for detecting, as a flammability of the fuel, one of:
an ignition delay period of the fuel;
an amount of variations of torque of the engine; and
a combustion period as time which elapses from start of combustion of the fuel to completion of combustion;
oxygen concentration increase circuitry configured for controlling the oxygen concentration variation device to increase oxygen concentration of the intake air supplied to the cylinder, when the flammability of the fuel is detected to be less than a predetermined reference value of flammability and the density of the fuel is detected to exceed a predetermined reference value of density, the predetermined reference value of flammability enabling judgement as to whether the flammability of the fuel is normal or not, the predetermined reference value of density enabling judgment as to whether the fuel is closer to a heavy fuel or a light fuel;
compression ratio increase circuitry configured for controlling the compression ratio variation device to increase the compression ratio of the intake air within the cylinder, when the flammability of the fuel is detected to be less than the reference value of flammability and the density of the fuel is detected to be less than the reference value of density.

2. The control apparatus according to claim 1 wherein each of the injections comprises a plurality of injections including a pilot injection, and the engine includes an injection amount variation device operable for varying an amount of each pilot injection;
wherein the control apparatus comprises pilot injection amount increase circuitry configured for controlling the fuel injector to increase the amount of each pilot injection, when the flammability of the fuel is detected to be less than the reference value of flammability and the density of the fuel is detected to be less than the reference value of density.

3. The control apparatus according to claim 1, wherein the engine includes a VVT (Variable Valve Timing) apparatus operable for varying opening and closing timings of at least one of an exhaust valve and an intake valve to respectively corresponding to the cylinder, and wherein the compression ratio increase circuitry operates the VVT apparatus to adjust the opening and closing timings such as to increase the compression ratio of the intake air in the cylinder, when the detected flammability is less than the reference value of flammability and the density of the fuel is detected to be less than the reference is value of density.

4. A control apparatus for application to a compression-ignition engine, the engine having at least one cylinder and a fuel injector controllable for executing injections of fuel into the cylinder, each of the injections comprises a plurality of injections including a pilot injection, and an oxygen concentration variation device operable for varying an oxygen concentration of intake air supplied to the cylinder:
wherein the control apparatus comprises:
density detection circuitry configured for detecting a density of the fuel which is injected by the fuel injector;
flammability detection circuitry configured for detecting a flammability of the fuel;
oxygen concentration increase circuitry configured for controlling the oxygen concentration variation device to increase the oxygen concentration of the intake air supplied to the cylinder when the flammability of the fuel is detected to be less than a predetermined reference value of flammability and the density of the fuel is detected to exceed a predetermined reference value of density, the predetermined reference value of flammability enabling judgement as to whether the flammability of the fuel is normal or not, the predetermined reference value of density enabling judgment as to whether the fuel is closer to a heavy fuel or a light fuel; and, pilot injection increase circuitry configured for controlling the fuel injector for increasing the amount of each pilot injection when the flammability of the fuel is detected to be less than the reference value of flammability and the density of the fuel is detected to be less than the reference value of density.

5. The control apparatus according to claim 1, wherein the oxygen to concentration variation device comprises an EGR (Exhaust Gas Recirculation) apparatus controllable for combining exhaust gas from the engine with the intake air supplied to the cylinder, and wherein the oxygen concentration increase circuitry controls the EGR apparatus to increase the oxygen concentration of the intake air by decreasing a flow rate of the exhaust gas that is combined with the intake air.

6. The control apparatus according to claim 1, wherein:
the engine includes a cylinder pressure sensor for detecting values of pressure within the cylinder,
the flammability detection circuitry detects an ignition delay period as an interval between commencement of an injection of fuel into the cylinder and subsequent ignition of the fuel, the ignition delay period being detected based on variations in the pressure within the cylinder, and
the detected flammability is judged to be less than the reference value of flammability when the ignition delay period exceeds a predetermined duration.

7. The control apparatus according to claim 1, wherein:
the engine includes a cylinder pressure sensor for detecting values of pressure within the cylinder,
the flammability detection circuitry detects a combustion period as an interval between a commencement of combustion of injected fuel within the cylinder and subsequent completion of the combustion, the combustion period being detected based on variations in the detected values of pressure within the cylinder, and
the detected flammability is judged to be less than the reference value of flammability when the combustion period exceeds a predetermined duration.

8. A method of controlling a compression-ignition engine having at least one cylinder and a fuel injector for executing injections of fuel into the cylinder, by repetitively executing a series of control operations comprising:
detecting a value of density of the fuel,
detecting, as a value of flammability of the fuel, one of:
an ignition delay period of the fuel;
an amount of variations of torque of the engine; and
a combustion period as time which elapses from start of combustion of the fuel to completion of combustion, when the detected value of flammability is less than a predetermined reference value of flammability and the detected value of density exceeds a predetermined reference value of density, increasing an oxygen concentration of the intake air supplied to the cylinder, the predetermined reference value of flammability enabling judgement as to whether the flammability of the fuel is normal or not, the predetermined reference value of density enabling judgment as to whether the fuel is closer to a heavy fuel or a light fuel, and when the detected value of flammability is less than the reference value of flammability and the detected value of density is less than the reference value of density, increasing a compression ratio of the intake air within the cylinder by a predetermined amount.

9. The method according to claim 8, wherein:
the engine includes a EGR (Exhaust Gas Recirculation) apparatus incorporating a control valve operable for varying the oxygen concentration of the intake air; and
wherein the oxygen concentration of the intake air is increased, in each repetition of the series of control operations, by adjusting an opening degree of the control valve of the EGR apparatus by a predetermined amount.

10. The method according to claim 8, wherein each injection comprises a plurality of injections including a pilot injection and wherein in each repetition of the series of control operations, when the detected value of flammability is less than the reference value of flammability and the detected value of density is less than the reference value of density, each pilot injection is increased to by a predetermined amount.

11. The method according to claim 8, comprising:
detecting values of pressure within the cylinder;
detecting an ignition delay period as an interval between commencement of an injection of fuel into the cylinder and subsequent ignition of the fuel, based on variations in the detected values of pressure; and
judging that the detected flammability is less than the reference value of flammability when the ignition delay period is detected to exceed a is predetermined duration.

12. The method according to claim 8, comprising:
detecting values of pressure within the cylinder;
detecting a combustion period as an interval between commencement of combustion of injected fuel within the cylinder and subsequent completion of the combustion of the injected fuel, the combustion period being detected based on variations in the detected values of pressure; and
judging that the detected flammability is less than the reference value of flammability when the combustion period is detected to exceed a predetermined duration.

* * * * *